(12) United States Patent
Townsend et al.

(10) Patent No.: US 9,176,158 B2
(45) Date of Patent: Nov. 3, 2015

(54) SENSOR

(75) Inventors: Kevin Townsend, Plymouth (GB);
Michael Durston, Plymouth (GB);
Douglas Robert Sitch, Plymouth (GB)

(73) Assignee: SILICON SENSING SYSTEMS LIMITED (GB)

( * ) Notice: Subject to any disclaimer, the term of this patent is extended or adjusted under 35 U.S.C. 154(b) by 352 days.

(21) Appl. No.: 13/580,616

(22) PCT Filed: Mar. 3, 2011

(86) PCT No.: PCT/EP2011/053184
§ 371 (c)(1),
(2), (4) Date: Oct. 30, 2012

(87) PCT Pub. No.: WO2011/107542
PCT Pub. Date: Sep. 9, 2011

(65) Prior Publication Data
US 2013/0081463 A1    Apr. 4, 2013

(30) Foreign Application Priority Data
Mar. 3, 2010 (GB) .................................. 1003539.2

(51) Int. Cl.
G01C 19/56 (2012.01)
G01P 3/14 (2006.01)
G01C 19/5684 (2012.01)

(52) U.S. Cl.
CPC .............. G01P 3/14 (2013.01); G01C 19/5684 (2013.01)

(58) Field of Classification Search
CPC .................................................. G01C 19/5684

USPC ............................................. 73/1.37, 504.13
See application file for complete search history.

(56) References Cited

U.S. PATENT DOCUMENTS 5,505,084 A     4/1996   Greiff et al.
5,889,193 A     3/1999   Pfaff et al.
6,151,964 A *  11/2000   Nakajima .................. 73/504.13

(Continued)

FOREIGN PATENT DOCUMENTS

CN           1720534 A        1/2006
DE     102008044664 A1        3/2010

(Continued)

OTHER PUBLICATIONS

International Search Report for PCT/EP2011/053184 dated Sep. 26, 2011.

(Continued)

Primary Examiner — John Chapman, Jr.
(74) Attorney, Agent, or Firm — Cantor Colburn LLP

(57) ABSTRACT

An inertial sensor is described that has a commanded test function. The sensor is of a ring type driven by a driver circuit, the sensor further includes primary and secondary portions having corresponding signal pickoffs. The primary pickoff signal amplitude is controlled via an automatic gain control, the primary phase lock loop and VCO locks to the resonant frequency to provide the clocks for the synchronous detectors, the primary pickoff signals via the primary phase shift circuit is provided to the primary driver, the secondary pickoff signal being input into a detector circuit capable of detecting motion in the sensor. The commanded test function includes a signal derived from the primary portion of the circuit and input into the two inputs of a differential amplifier in the secondary pickoff detector circuit.

10 Claims, 2 Drawing Sheets

(56) References Cited

U.S. PATENT DOCUMENTS

Figure 1:
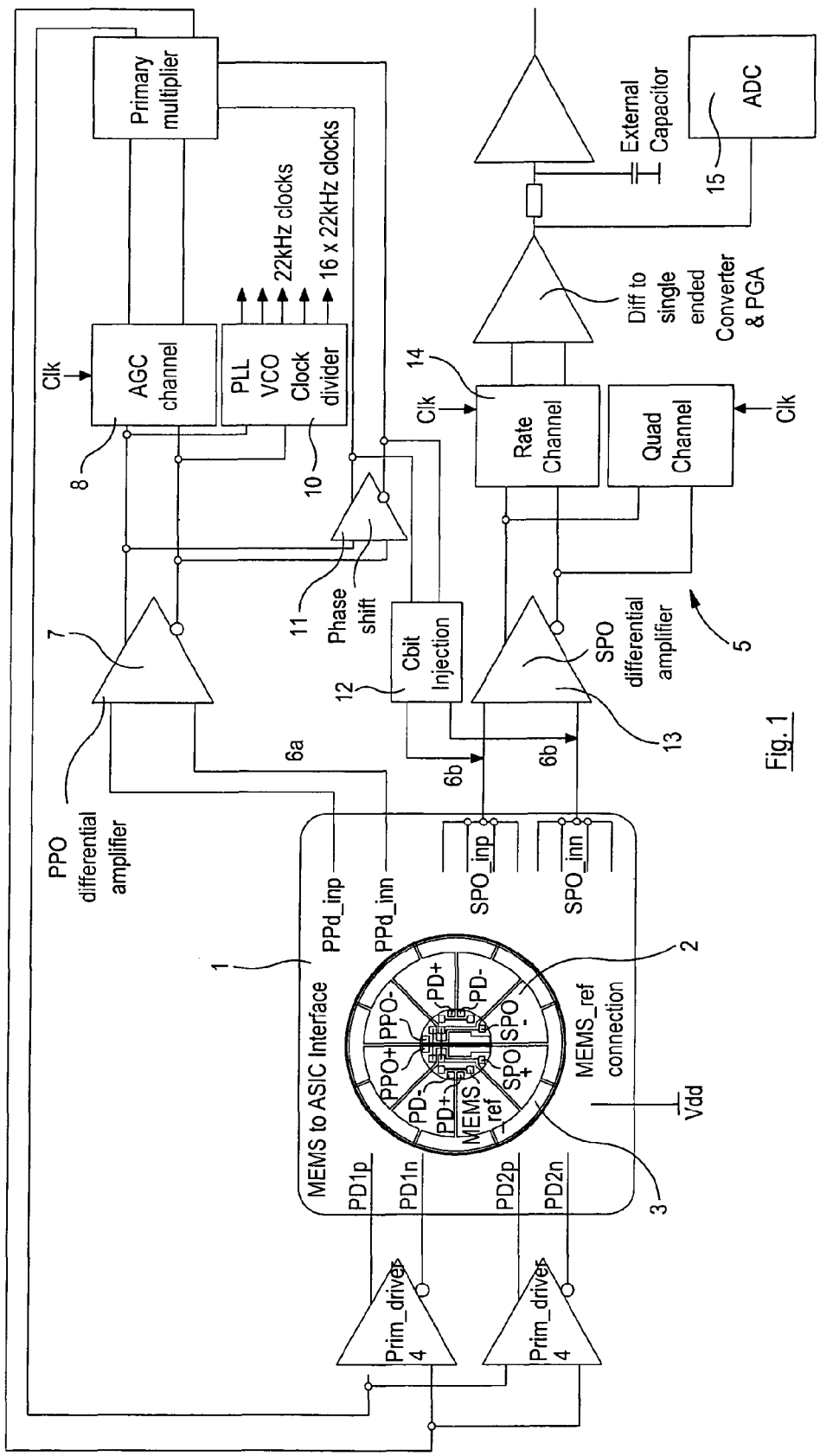

| | | | |
|---|---|---|---|
| 6,427,518 B1 * | 8/2002 | Miekley et al. | ............. 73/1.37 |
| 2005/0091006 A1 | 4/2005 | Rober | |
| 2005/0268716 A1 | 12/2005 | Hrovat et al. | |
| 2006/0071578 A1 | 4/2006 | Drabe et al. | |
| 2006/0238260 A1 | 10/2006 | Demma et al. | |

FOREIGN PATENT DOCUMENTS

| | | | |
|---|---|---|---|
| EP | 1335185 A1 | 8/2003 | |
| EP | 2177875 A2 | 4/2010 | |
| JP | H0861961 A | 3/1996 | |
| JP | 2000171257 A | 6/2000 | |
| JP | 2003530563 A | 10/2003 | |
| JP | 2008064663 A | 3/2008 | |
| JP | 2008122122 A | 5/2008 | |
| JP | 2008271258 A | 11/2008 | |
| JP | 2009149145 A | 7/2009 | |
| JP | 2010512049 A | 4/2010 | |
| WO | 2004046650 A1 | 6/2004 | |

OTHER PUBLICATIONS

Chinese Office Action for related Chinese Application No. 201180012181.4; Dated: Nov. 15, 2014; 7 pages.
English Translation for related Chinese Office Action; Chinese Application No. 201180012181.4; Dated: Nov. 15, 2014; 9 pages.
English Translation of Japanese Office Action for related Japanese Patent Application No. 2012-555425; mailed: Oct. 10, 2014; 3 pages.
Great Britian Search Report for Related Great Britian Application No. 1003539.2; Dated: Jun. 22, 2015; 31 pages.

* cited by examiner

SENSOR

CROSS REFERENCE TO RELATED APPLICATION

The present application is the U.S. national stage application of International Application PCT/EP2011/053184, filed Mar. 3, 2011, which international application was published on Sep. 9, 2011, as International Publication WO 2011/107542. The International Application claims priority of British Patent Application 1003539.2, filed Mar. 3, 2010, the contents of which are incorporated herein by reference in their entireties.

The invention relates to sensors. More specifically but not exclusively it relates to sensors such as inertial sensors, for example accelerometers and gyroscopes, having a commanded built in test (CBit).

Many types of inertial sensors are known. Angular velocity sensors incorporating a MEMS type ring are known and such examples can be seen in, for example, GB2322196. In such angular velocity sensors a vibrating planar ring or hoop-like structure is disclosed. The ring-like structure is suspended in space by a suitable support mount for detecting turning rate, linear acceleration and angular acceleration. Turning rate is sensed by detecting vibrations coupled by Coriolis forces, whereas linear acceleration and angular acceleration are sensed by lateral, vertical and rocking movement of the entire ring or hoop-like structure within its mount.

The ability for a user to command a check of a MEMS rate sensor has previously been limited to a connectivity check. A typical MEMS rate sensor user check either just forces the MEMS structure to end limits or the tolerances of an in range change are such that limited information of operation can be achieved. Also these checks often provide very limited coverage of the complete system operation.

According to the invention there is provided an angular velocity sensor comprising a ring type sensor having primary and secondary elements, the sensor further comprising primary and secondary channels connected to said primary and secondary elements, the primary channel comprising primary driver means for initiating and maintaining resonant oscillations in the primary elements, the secondary channel comprising detector means for detecting signals generated by the secondary elements in response to movement of the sensor, the detecting means including a differential amplifier and synchronous detectors generating an output signal dependent upon the movement of the sensor, wherein the secondary channel further comprises test means that, when operable, inputs signals onto both channels of the secondary channel differential amplifier, said signals being respectively out of phase such that an offset in the output signal is generated, said offset being indicative of the status of the sensor.

Figure 2:
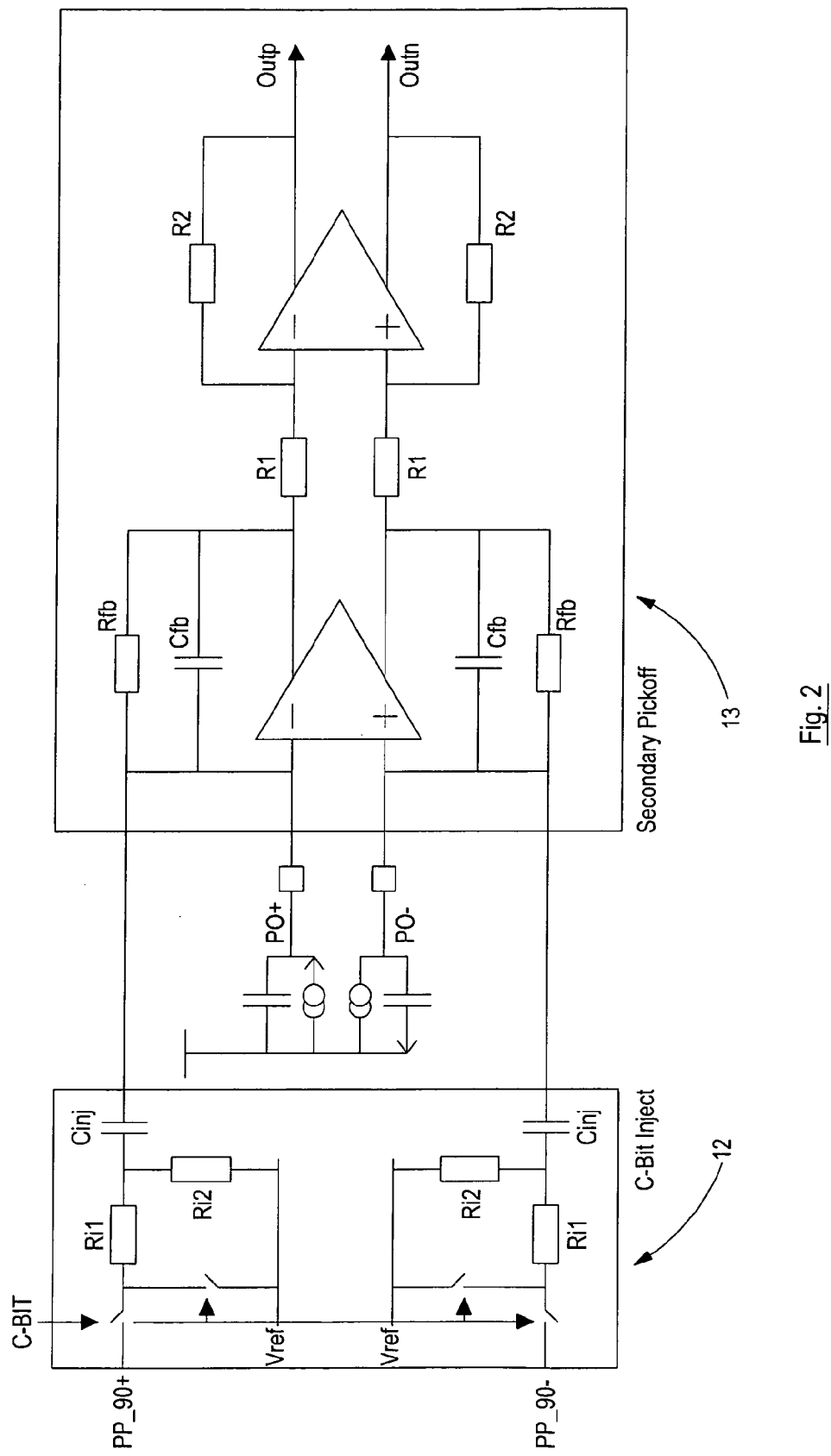

The invention will now be described with reference to the accompanying diagrammatic drawings in which:

FIG. 1 is a schematic drawing of an angular sensor in accordance with one form of the invention including commanded built in test (Cbit) enabling testing of primary MEMS pickoff transducers, primary pickoff amplifier, secondary pickoff amplifier, primary automatic gain control (AGC) loop, primary phase lock loop and voltage controlled oscillator, primary drivers, primary MEMS driver transducers and primary channel pickoff phase shifter (PP90); and FIG. 2 is a schematic diagram of one form of the Cbit signal injection circuit into pickoff amplifiers of the angular velocity sensor of FIG. 1.

As shown in FIG. 1, the MEMS ring structure 1 of the angular velocity sensor comprises inner 2 and outer 3 peripheries extending around a common axis and therefore the drive and pickoffs operate differentially. Piezoelectric primary drive means 4 are provided that cause the sensor to vibrate on supports (not shown). The supports may include a plurality of flexible support beams (not shown) for supporting the sensor and for allowing it to vibrate in response to the piezoelectric primary drive means input in a substantially undamped oscillation mode. This enables the resonator to move relative to the support means in response to turning rate of the system including the sensor.

A detecting circuit 5 is provided to which a series of signals 6 are input from the sensor. The signals output by the sensor include primary pickoff signals 6a and secondary pickoff signals 6b and the transducer plates are arranged such that the signals are of a differential form. These signals are output from primary and secondary portions of the sensor. The primary pickoff differential transducer signal is input to a differential charge amplifier (primary pickoff amplifier) 7 which provides a high level of gain to provide a low noise differential sinusoidal output signal at the carrier frequency. This signal is then passed through a synchronous detector 8 and suitable filtering to provide a control signal to the primary driver circuit 4 to set the level of the drive applied to the MEMS ring structure 1 to ensure the primary pickoff amplifier output is on a controlled fixed level. The output of the primary pickoff amplifier 7 is also applied to the primary phase lock loop (PLL) and voltage controlled oscillator (VCO) 10 which locks to the pickoff signal to provide clocks for the synchronous detectors 8. The output of the primary pickoff amplifier 7 is also applied to the primary phase shift circuit 11 which amplifies the signal by a factor of two and shifts the phase of the differential signal by 90°. The output of the phase shift circuit 11 is applied to the primary driver circuit 4 which multiplies the differential sinusoidal output of the phase shift circuit 11 by the AGC control signal to generate the differential MEMS driver waveforms. The output of the phase shift circuit 11 is applied to the commanded BIT (CBit) injection circuit 12 which provides a high level of isolation when CBit is not selected and couples in an attenuated version of the differential signal to the differential inputs of a further differential charge amplifier (secondary pickoff amplifier) 13 when commanded BIT is selected. The injected differential signal is then amplified by the secondary pickoff amplifier 13 and is of the correct phase to pass through the rate channel synchronous detector 14. The synchronous detector outputs an offset relative to the amplitude of the injected differential signal which is then filtered and converted into a single ended offset on the rate output signal and input to the ADC 15.

The requirement of Cbit is to test as much of the system as possible to provide a relatively known output. Under the control of an enabling signal, the differential primary pickoff signal with a 90 degree phase shift can be fed into the differential inputs of the secondary pickoff amplifier 13, not the pick offs which are physically on the ring. This signal is of the correct phase to be demodulated and used to provide a controlled output of the rate output. This tests the primary pickoff MEMS transducers, the primary pickoff amplifier 7, the primary AGC loop the primary PLL and VCO channel 10, the primary driver circuits, the MEMS primary driver transducers, the primary phase shift circuit (PP90) 11 as well as the secondary pickoff amplifier 13, rate channel 14, rate output and ADC 15.

As the secondary pickoff amplifier 13 has a high gain it is necessary to attenuate the signal to avoid saturation of the rate channel 14. In addition, the rate setting used in the rate output stage is not known, so a smaller signal is used to avoid saturation of the rate output.

FIG. 2 shows the method used in more detail. The signal is added at the summing junction on both of the differential inputs to the secondary pickoff charge amplifier 13. It is coupled in by a small capacitor Cinj (260 fF) to create a first stage gain of 0.007 (Cfb=35.8 pF). Along with a 5:1 input attenuator (Ri1=200 k, Ri2=50 k) and a second stage gain of 35, the overall gain is 0.05. Thus a 500 mV peak signal on primary phase shift circuit (PP90) output creates a secondary pickoff signal of 25 mV peak.

With Cbit enabled, a signal appears on the output of the secondary pickoff amplifier 13 in phase with the rate channel demodulator clock. In this mode, an offset of around 50 deg/sec is seen on the rate output signal, both on the analogue signal and the digital signal. This offset, when OBIT is operative, demonstrates correct operation of the gyro to the user.

In this way, the user command test function (Cbit) uses signals from the primary resonant sustaining loops to generate a disturbance in the secondary rate detection channel.

On application of the test the correctly phased signal from the primary resonant sustaining loop is coupled into the front end of the electronics secondary rate detection channel, scaled to a suitable level. This passes through the complete rate detection channel and provides a measurable change in the output signal of the usual rate signal.

As the disturbance is generated from the differential MEMS transducer outputs of the primary resonant sustaining loop it ensures that the system has locked to the resonant frequency and that the resonant sustaining loop amplitude of motion is controlled correctly.

As the disturbance is coupled into the very front stage of the electronics rate detection channel the complete rate detection channel is checked (excluding the secondary pick off transducers on the ring).

The tolerances are such that the magnitude of the rate signal disturbance can be used to detect loss of part of the circuitry in both the primary resonant sustaining loop and the secondary rate detection channel although it may not identify which circuit element has failed.

When disabled, the Cbit injection path has a high level of isolation by the use of series and parallel switches (Rmax_on=1 k). Additionally the outputs of the injection block have 50 ohm series resistors to provide current limiting (for ESD protection) as the summing nodes are directly connected to the pickoff bond pads.

In order for Cbit to give a correct offset then the phase lock loop and VCO 10 part of the primary loop must be locked to enable the primary differential pickoff signals to exist. The AGC 16 must be operating to give the correct amplitude and therefore correct level of primary pickoff amplitude. The primary pickoff and the primary phase shift circuit 11 must be operating to provide the primary drive signals and the differential signal through the Cbit injection circuit 12 to the secondary loop. The primary drivers must be operating to close the loops around the primary circuit and the secondary pickoff amplifier 13 must be functioning to give the correct level at the rate channel demodulator. The rate channel demodulator, filtering, decimator and notch filter must be correct to provide correct level to the rate output stage. Additionally, the rate output gain setting must be correct to achieve the expected offset on the output and finally the ADC 15 and ADC references must be operating correctly to achieve the correct offset on the digital rate output.

In a second embodiment of the invention, the operation of the primary and secondary channels is broadly the same, the primary channel includes a synchronous detector 8 receiving a signal from the primary pick off on the ring, the output of which feeds back to the primary drive, and is controlled in amplitude by an AGC. This gives closed loop operation of the primary loop. The secondary channel operates in open loop, so there is no feedback.

In the primary loop there is a phase locked loop to control the frequency of the primary loop by means of a VCO. The secondary channel picks up the Coriolis coupled signals at the secondary transducers on the ring. There are electrodes on the inside and outside part of the annular ring which give signals in anti phase. These anti phase signals are injected to two inputs of a differential amplifier 13 the output of which feeds to the secondary synchronous amplifier 14 and thence to the rate output. Also the signals at 45 deg and 225 deg (secondary pick offs) on the ring are anti phase to the signals at 135 and 315 deg. This assumes that the primary has pick off and drive transducers which may be at 0, 90, 180 and 270 degrees Thus we have 4 secondary pick off in phase and 4 pick offs anti phase in as shown in FIG. 1 (4 electrodes on the outside and 4 on the inside of the annulus). The two anti phase signals go to the two inputs of the differential amplifier of the secondary channel charge amplifier 13 into which the OBIT signal is injected which is derived from the primary signals. This then goes to the secondary synchronous amplifier and thence as the rate output signal. The CBIT injected signal thus causes an offset of the rate output signal, rather than there being a separate test output channel.

In a third embodiment of the invention, in which all similarly numbered parts have the same function as those described above, two signals derived from the primary channel are injected via a suitable attenuation circuit onto the two inputs of the secondary channel differential amplifier 13 virtual earth points under command of a signal from the user. Both signals are at 180° phase with respect to the 0° phase primary drive waveform. The first signal is connected to one of the secondary pickoff differential amplifier 13 inputs and the second signal is connected to the other input of the differential amplifier 13. The amplitudes of the respective signals are different. The differential amplifier thereby produces an output which is related to the difference in the amplitude of the two applied signals. This difference will pass through the rate channel synchronous detector 14 and cause a user measurable change in the rate signal. Suitable choice of the difference in the amplitudes of the two applied signals will allow detection of single input channel failures as well as the correct operation of the primary and secondary channels.

In a fourth embodiment of the invention two signals derived from the primary channel are injected via a suitable attenuation circuit onto the two inputs of the secondary channel differential amplifier 13 virtual earth points under command of a signal from the user. The signals are at 45° and 225° phase with respect to the 0° phase primary drive waveform. The first signal is connected to one of the secondary pickoff differential amplifier 13 inputs and the second signal is connected to the other input of the differential amplifier 13. The differential amplifier 13 will then produce an output which is related to the difference in the amplitude of the two applied signals. A proportion of the applied signal that is in phase with the rate channel synchronous detector 14 clock will pass through the rate channel synchronous detector 14 and cause a user measurable change in the rate signal. A proportion of the applied signal that is in phase with a quad channel synchronous detector 18 clock will pass through the quad channel synchronous detector 18 and cause a change in the quad channel signal. This will allow detection of single input channel failures as well as the correct operation of the primary and secondary channels. In addition this allows the quadrature channel function to be check if desired.

In a fifth embodiment of the invention two signals are derived from four signals from the primary channel, said two signals being injected via a suitable attenuation circuit, onto the two inputs of the secondary channel differential amplifier 13 virtual earth points under command of a signal from the user. The four signals are at −90°, +90°, 0° and 180° with respect to the 0° phase primary drive waveform. These are generated from two parts of the primary circuit. This creates a 45° and a 225° signal where one signal is connected to one of the secondary pickoff differential amplifier 13 inputs and the other signal is connected to the other input of the differential amplifier 13. The differential amplifier 13 will then produce an output which is related to the difference in the amplitude of the two applied signals. A proportion of the applied signal that is in phase with the rate channel synchronous detector 14 clock will pass through the rate channel synchronous detector 14 and cause a user measurable change in the rate signal. A proportion of the applied signal that is in phase with the quad channel synchronous detector 18 clock will pass through the quad channel synchronous detector 18 and cause a change in the quad channel signal. This will allow detection of single input channel failures as well as the correct operation of the primary and secondary channels. In addition this allows the quadrature channel function to be check if desired. Also as the signals are generated from two points of the primary channel it provides additional fault detection of the primary channel.

A further embodiment of the invention will now be described where CBit is implemented using a circuit similar to that described in FIG. 1 and in which all similar components performing the same function are similarly numbered. In this embodiment the circuit provides an offset at the output of the secondary pickoff amplifiers 13, when commanded, that is at 45° with respect to the rate 14 and quadrature demodulator clocks. The offset therefore contains a component of the signal that is both in phase with the rate channel demodulator clock, and therefore provides an offset through the rate channel which can be seen on the rate signal, and a component of the signal in phase with the quadrature demodulator clock, therefore provides an offset through the quadrature channel which can be seen on the quadrature signal.

The 45° offset is generated by the following method. The 0° phase primary pickoff signal is applied with suitable attenuation to one of the inputs of the differential secondary pickoff amplifier 13. The 90° phase shifted primary pickoff signal is applied with suitable attenuation to the other input of the differential secondary pickoff amplifier 13. The secondary pickoff amplifier then mixes the two signals and generates the 45° output signal. In this embodiment, the connections to the Cbit injection circuit 12 are from two different points within the primary channel and the quad channel now feeds an ADC using either one or two ADC circuits not shown.

By implementing the circuit in the above described way it provides additional fault coverage, over and above the previously described Cbit implementation.

For example, the circuit can detect a loss of a wire bond connection from the MEMS secondary pickoff transducers 2 to the secondary pickoff amplifier. A loss of a wire bond causes the gain on that channel of the differential secondary pickoff amplifier to change. This results in the effective phase of the output offset under Cbit changing which will then change the level of the offset measure on the rate 14 and quadrature channels.

Secondly, the quadrature signal is now used as part of continuous monitoring of the health of the system. The application of the 45° Cbit signal allows the quadrature monitoring channel operation to be checked to ensure correct operation and gain in addition to the rate channel 14.

Thirdly, the circuit that generates the 90° phase shifted pickoff signal, which is used elsewhere in the primary channel of the systems, also has additional level of fault detection. As the Cbit injection uses one signal from before this circuit and one signal from the output of this circuit a gain and phase error within this circuit will cause the Cbit offset to be incorrect and therefore detectable in a change in the levels on the rate 14 and quadrature channels.

Moreover, using the adapted circuit, causes a gain change, due to an internal circuit fault, on one channel of the secondary pickoff amplifier 13 circuit and would cause the phase and offset of the Cbit signal output to alter and therefore is detectable on the quadrature and rate 14 channel offsets.

It will be appreciated that one further aspect of all of the implementations described above, which applies to both the normal Cbit and the 45° Cbit variants, is that where there is more than one selectable output measurement range, the offset levels are deliberately chosen to be different. This allows the incorrect range selection to be detected as the offset under application on the Cbit signal would be different to the level expected.

It will be appreciated that although the invention is described with reference to an annular velocity sensor of the type described above, it may equally be applied to a sensor such as a piezo ring case, the same applying to other forms of transduction such as piezo, capacitive, inductive.

It will further be appreciated that the inner and outer electrodes only relate to the piezo. Anti phase signals can be obtained from 45 deg to 135 deg etc from non piezo pick offs, such as inductive or capacitive pickoffs.

The invention claimed is:

1. An angular velocity sensor comprising a ring type sensor having primary and secondary elements, the sensor further comprising primary and secondary channels connected to said primary and secondary elements, the primary channel comprising primary driver means for initiating and maintaining resonant oscillations in the primary elements, the secondary channel operating in an open loop manner, thereby requiring no feedback and the secondary channel comprising detector means for detecting signals generated by the secondary elements in response to movement of the sensor, the detector means including a secondary channel differential amplifier and synchronous detectors generating an output signal dependent upon the movement of the sensor, wherein the secondary channel further comprises selectively operable test means that, when operable, inputs signals onto both channels of the secondary channel differential amplifier, said signals being respectively out of phase such that an offset in the output signal is generated, said offset being indicative of the status of the sensor.

2. A sensor according to claim 1 in which the primary elements generate two primary pickoff signals output to the primary channel, said primary pickoff signals being amplified and phase shifted by suitable means and input into respective channels of the secondary channel differential amplifier.

3. A sensor according to claim 2 in which the phase shift is 90 degrees.

4. A sensor according to claim 1 in which the outputs of the secondary channel differential amplifier are input to a rate channel synchronous detector and a quad channel synchronous detector, said rate channel synchronous detector having a clock input, the output of the secondary channel differential amplifier, when the test is operable, generating a signal in phase with the rate channel clock.

5. A sensor according to claim 1, in which the primary elements comprise pick off and drive transducers at 0, 90, 180 and 270 degrees on the ring and the secondary elements comprise 45, 135, 225 and 315 degrees.

6. A sensor according to claim 5 in which signals generated by the 45 and 225 degree elements on the ring are anti phase to the signals at 135 and 315 degrees.

7. A sensor according to claim 1 in which the elements are piezo electrodes.

8. A sensor according to claim 1 in which the signals applied to the secondary channel differential amplifier are respectively 180 degrees out of phase.

9. A sensor according to claim 1 in which the primary channel includes a synchronous detector receiving a signal from the primary pick off on the ring, the output of which feeds back to the primary drive, and is controlled in amplitude by an automatic gain control (AGC), thereby enabling closed loop operation of the primary channel.

10. A sensor according to claim 1 in which the primary channel further comprises a phase locked loop to control the frequency of the primary channel by means of a voltage controlled oscillator (VCO).

\* \* \* \* \*